United States Patent
Kang et al.

(10) Patent No.: US 10,246,166 B2
(45) Date of Patent: Apr. 2, 2019

(54) NATURAL GAS HYDRATE TANK CONTAINER LOADING SYSTEM ENABLING SELF-POWERED POWER GENERATION AND BOIL-OFF GAS TREATMENT

(71) Applicant: Korea Institute of Ocean Science and Technology, Gyeonggi-do (KR)

(72) Inventors: Hee Jin Kang, Chungcheongnam (KR); Myung Soo Shin, Daejeon (KR); Min Suk Ki, Sejong (KR)

(73) Assignee: KOREA INSTITUTE OF OCEAN, SCIENCE AND TECHNOLOGY, Gyeonggi-Do (KR)

( * ) Notice: Subject to any disclaimer, the term of this patent is extended or adjusted under 35 U.S.C. 154(b) by 126 days.

(21) Appl. No.: 15/521,140

(22) PCT Filed: Dec. 17, 2014

(86) PCT No.: PCT/KR2014/012441
§ 371 (c)(1),
(2) Date: Apr. 21, 2017

(87) PCT Pub. No.: WO2016/085027
PCT Pub. Date: Jun. 2, 2016

(65) Prior Publication Data
US 2018/0009511 A1    Jan. 11, 2018

(30) Foreign Application Priority Data

Nov. 27, 2014 (KR) .......... 10-2014-0167274

(51) Int. Cl.
*B63B 25/04* (2006.01)
*B63J 2/12* (2006.01)
(Continued)

(52) U.S. Cl.
CPC .............. *B63B 25/04* (2013.01); *B63B 25/14* (2013.01); *B63H 21/38* (2013.01); *B63J 2/12* (2013.01);
(Continued)

(58) Field of Classification Search
CPC ......... B63B 25/04; B63B 25/14; B63H 21/38; B63J 2/12
See application file for complete search history.

(56) References Cited

U.S. PATENT DOCUMENTS 5,540,190 A * 7/1996 Rogers .................... F02B 43/00
123/1 A
5,950,732 A * 9/1999 Agee ........................ C10G 2/30
166/248
(Continued)

FOREIGN PATENT DOCUMENTS

JP   2005-029163 A   2/2005
JP   2008-106731 A   5/2008
(Continued)

OTHER PUBLICATIONS

PCT International Search Report and Written Opinion issued in connection with PCT/KR2014/012441 dated Aug. 3, 2015 with English translation.
(Continued)

*Primary Examiner* — Stephen P Avila
(74) *Attorney, Agent, or Firm* — Dentons US LLP

(57) ABSTRACT

The present disclosure relates to a natural gas hydrate tank container loading system for transporting natural gas hydrate, and the present disclosure provides a natural gas hydrate tank container loading system, enabling self-powered power generation and boil-off (BOG) gas treatment, includes: a refrigerator for inhibiting the generation of boil-off gas which naturally generates in a natural gas
(Continued)

hydrate tank container during transportation; and a solar cell, a battery, and a generator, which operates by means of the boil-off gas, for supplying electric power to the refrigerator, thereby ensuring a generation capacity sufficient to operate the refrigerator by means of the solar cell, the generator, and the battery, and thus always maintaining a stable phase equilibrium (self-preservation) in the natural gas hydrate tank container even during long-distance transportation and solving problems of fire, environmental pollution, or the like which occur when the boil-off gas (BOG) is discharged to the outside.

4 Claims, 6 Drawing Sheets

(51) Int. Cl.

| | | |
|---|---|---|
| *B63J 3/00* | (2006.01) | |
| *H02S 10/00* | (2014.01) | |
| *B63B 25/14* | (2006.01) | |
| *B63H 21/38* | (2006.01) | |
| *B63J 2/14* | (2006.01) | |
| *F17C 1/00* | (2006.01) | |
| *F17C 13/08* | (2006.01) | |
| *F17C 13/12* | (2006.01) | |
| *H02S 10/40* | (2014.01) | |
| *B63J 99/00* | (2009.01) | |

(52) U.S. Cl.
 CPC . *B63J 2/14* (2013.01); *B63J 3/00* (2013.01); *F17C 1/002* (2013.01); *F17C 13/082* (2013.01); *F17C 13/126* (2013.01); *H02S 10/00* (2013.01); B63J 2099/003 (2013.01); F17C 2201/0119 (2013.01); F17C 2201/054 (2013.01); F17C 2205/0107 (2013.01); F17C 2205/0111 (2013.01); F17C 2205/0157 (2013.01); F17C 2205/0169 (2013.01); F17C 2205/0323 (2013.01); F17C 2205/0352 (2013.01); F17C 2205/0373 (2013.01); F17C 2221/033 (2013.01); F17C 2221/036 (2013.01); F17C 2223/0184 (2013.01); F17C 2227/0157 (2013.01); F17C 2227/0337 (2013.01); F17C 2227/0376 (2013.01); F17C 2227/0383 (2013.01); F17C 2250/03 (2013.01); F17C 2250/043 (2013.01); F17C 2250/0439 (2013.01); F17C 2250/0652 (2013.01); F17C 2260/021 (2013.01); F17C 2260/056 (2013.01); F17C 2265/02 (2013.01); F17C 2265/031 (2013.01); F17C 2265/04 (2013.01); F17C 2265/07 (2013.01); F17C 2270/0105 (2013.01); *H02S 10/40* (2014.12)

(56) References Cited

U.S. PATENT DOCUMENTS

| | | | | |
|---|---|---|---|---|
| 5,964,093 | A * | 10/1999 | Heinemann | F17C 9/02 585/15 |
| 6,028,235 | A * | 2/2000 | Heinemann | F17C 9/00 585/15 |
| 6,082,118 | A * | 7/2000 | Endrizzi | F17C 11/007 585/15 |
| 6,214,175 | B1 * | 4/2001 | Heinemann | C10L 3/06 204/157.15 |

FOREIGN PATENT DOCUMENTS

| | | |
|---|---|---|
| JP | 2014-216027 A | 11/2014 |
| KR | 10-0840059 | 6/2008 |
| KR | 10-0941485 B1 | 2/2010 |
| KR | 10-2012-0014820 | 2/2012 |
| KR | 10-1149498 | 5/2012 |
| KR | 10-2012-0118546 | 10/2012 |
| KR | 10-1255547 | 4/2013 |
| KR | 10-1262647 | 5/2013 |
| KR | 10-2014-0065588 | 5/2014 |
| WO | WO/2011/138988 A1 | 11/2011 |

OTHER PUBLICATIONS

Korean Office Examination Report issued in connection with related Korean Patent Application No. KR 10-2014-0167274 dated Apr. 26, 2016 with English translation.

* cited by examiner

【Figure 1】
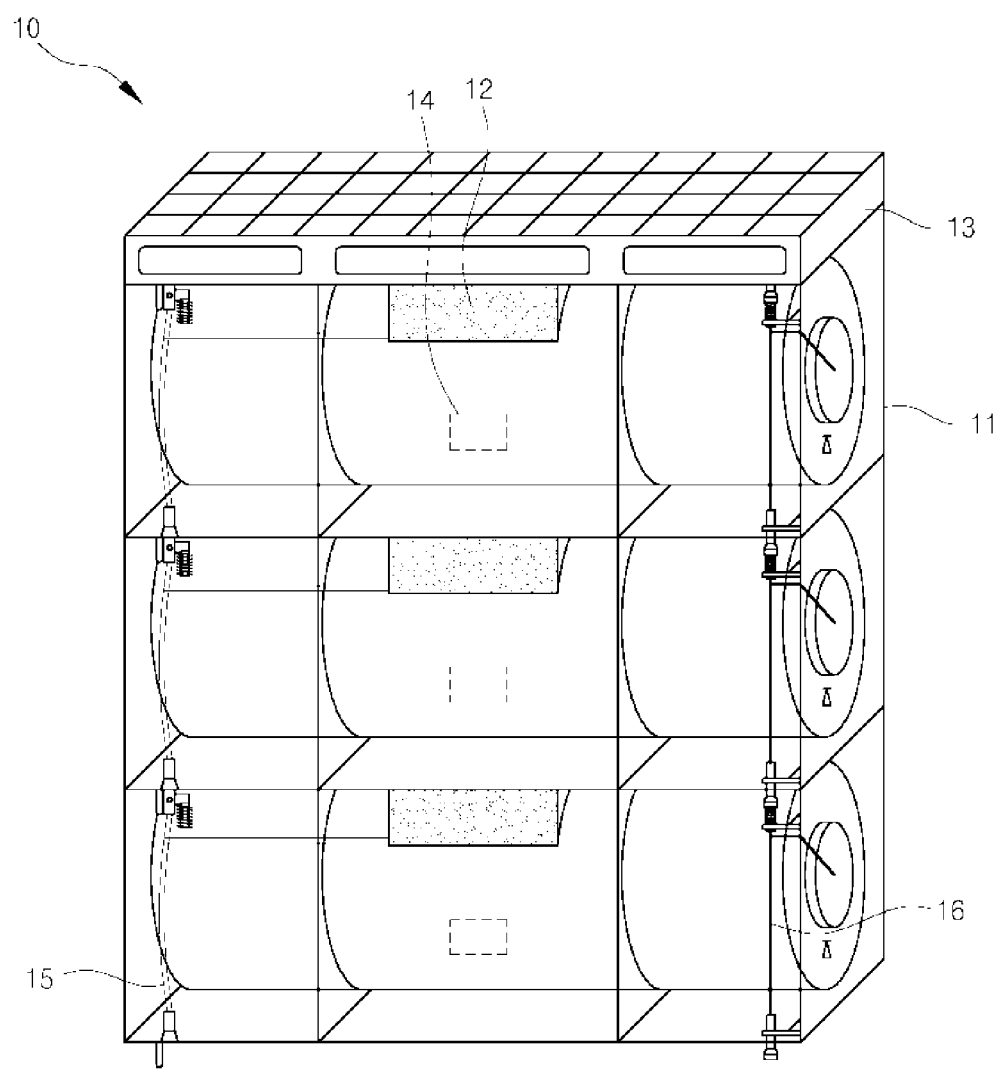

【Figure 2】
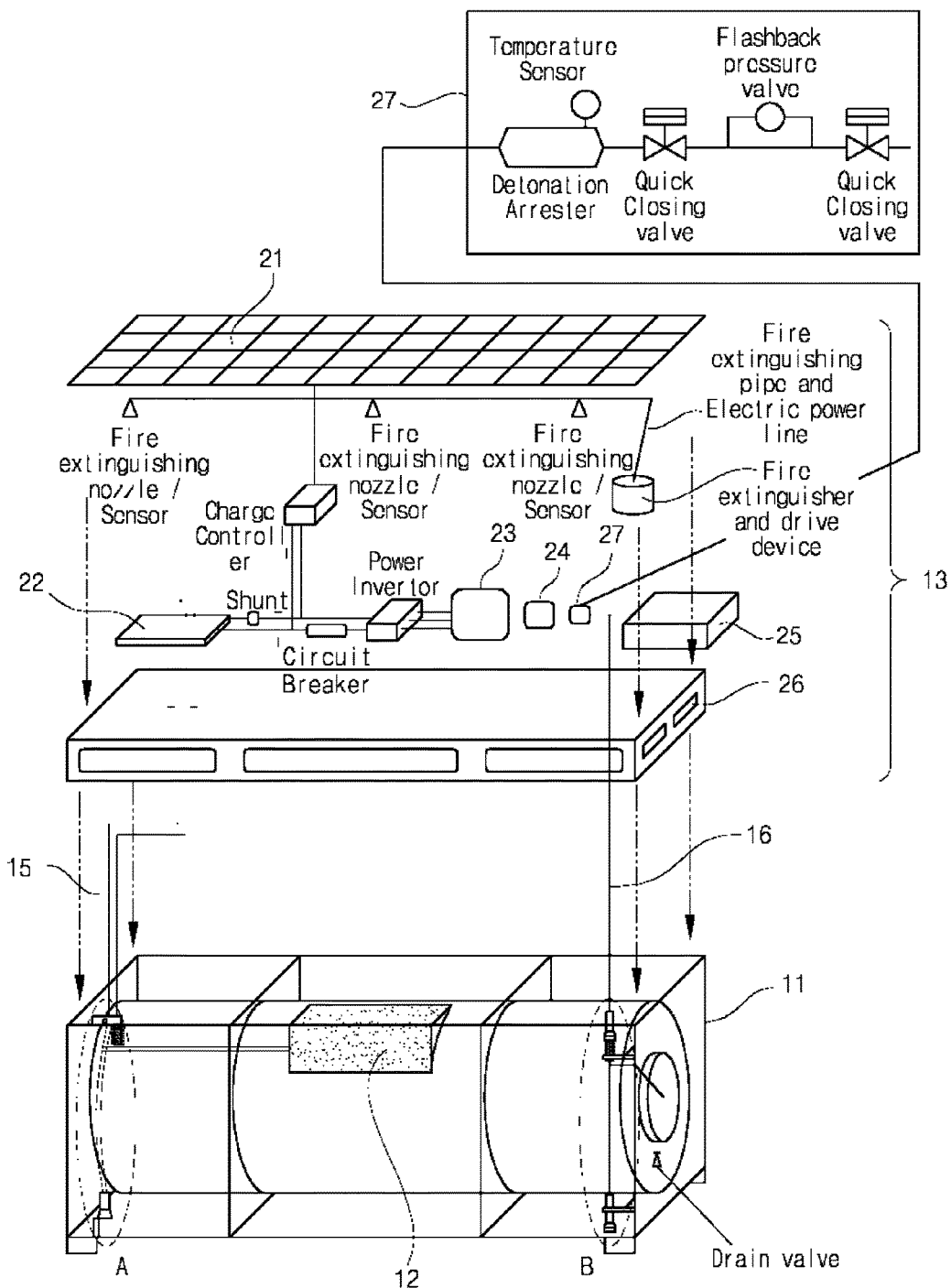

[Figure 3]
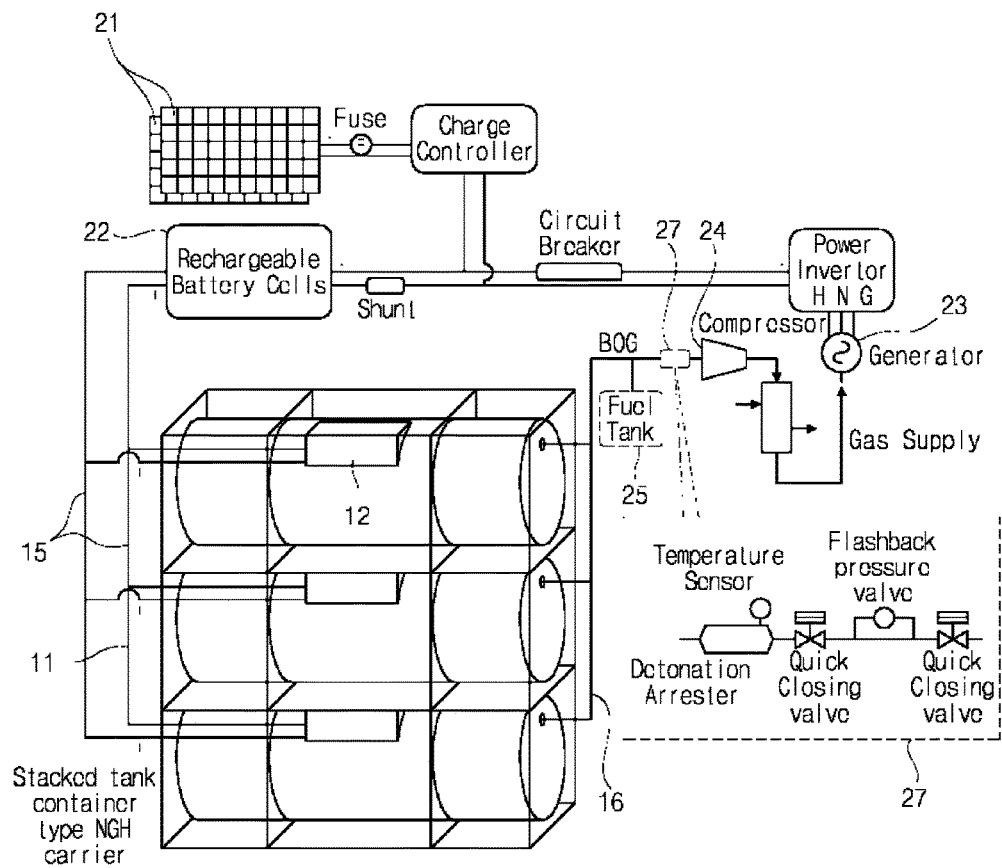

[Figure 4]
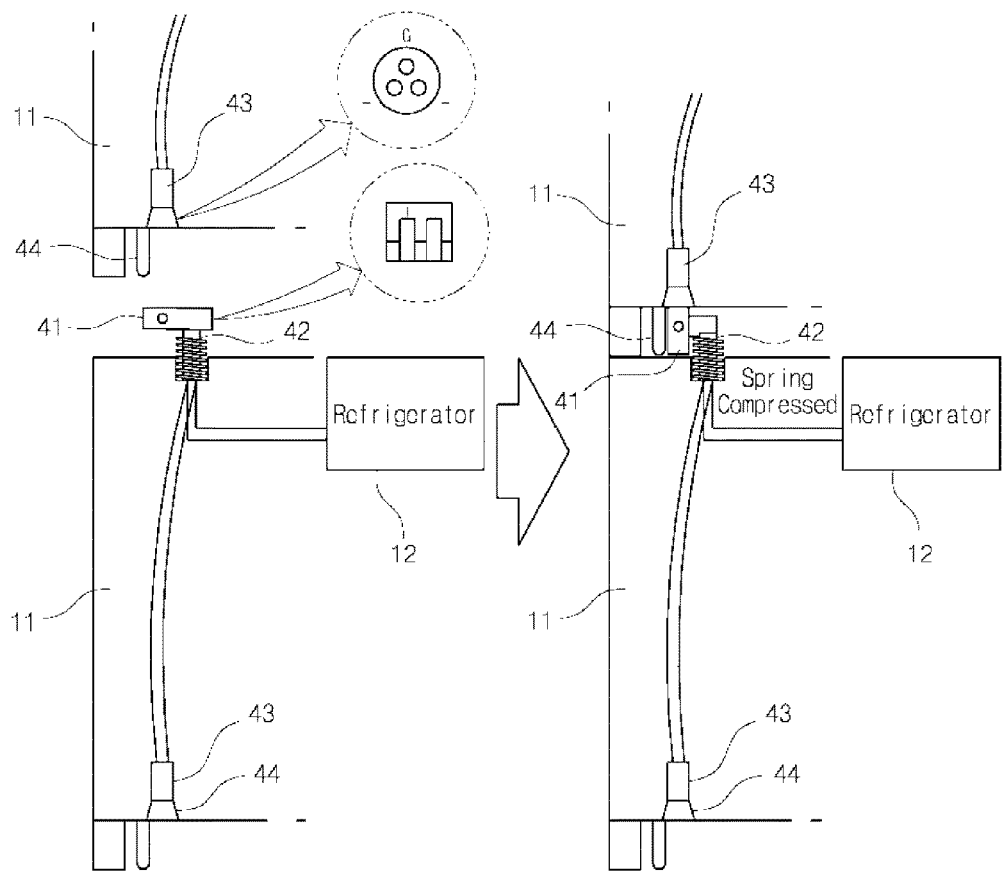

【Figure 5】
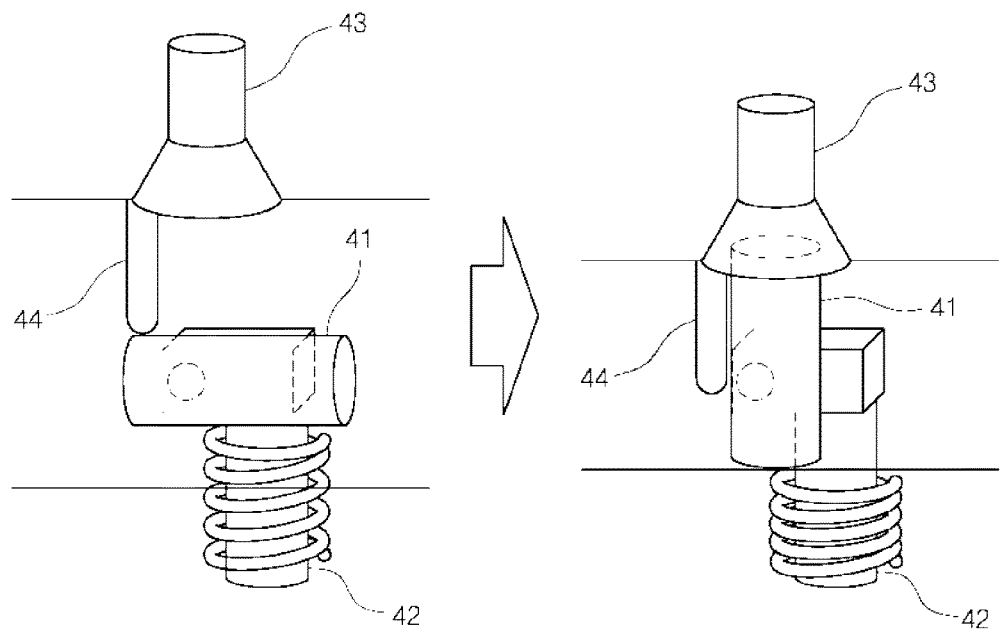

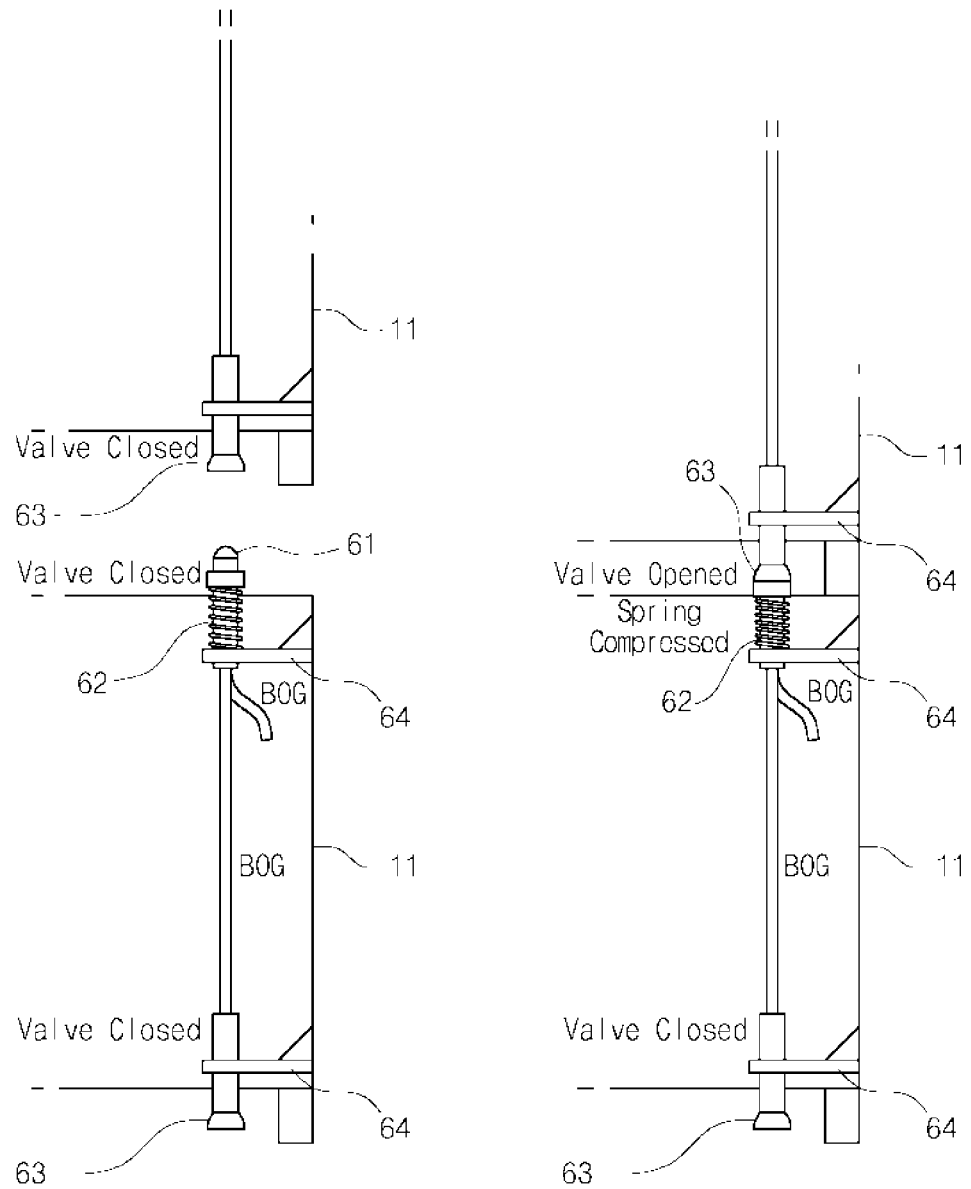
[Figure 6]

NATURAL GAS HYDRATE TANK CONTAINER LOADING SYSTEM ENABLING SELF-POWERED POWER GENERATION AND BOIL-OFF GAS TREATMENT

CROSS-REFERENCE TO RELATED APPLICATIONS

This application is the section 371 National Stage of PCT/KR2014/012441 filed Dec. 17, 2014, the entirety of which is incorporated herein by reference to the extent permitted by law. This application claims the benefit of priority of Korean Patent Application No. KR 10-2014-0167274, filed Nov. 27, 2014, the entirety of which is incorporated herein by reference to the extent permitted by law.

TECHNICAL FIELD

The present disclosure relates to a loading system for transporting natural gas hydrate, and more particularly, to a natural gas hydrate tank container loading system which enables self-powered power generation and boil-off gas treatment, may stack and transport a plurality of natural gas hydrate tank containers for transporting the natural gas hydrate, and includes a refrigerator for inhibiting the generation of boil-off gas (BOG) which naturally occurs in the respective natural gas hydrate tank containers during transportation of the natural gas hydrate, a solar cell installed on an uppermost container, among the plurality of natural gas hydrate tank containers stacked in a vertical direction, for supplying electric power to the refrigerator, and a battery for storing electrical energy produced by the solar cell, thereby always maintaining a stable phase equilibrium (self-preservation) in the stacked natural gas hydrate tank containers even during long-distance transportation.

In addition, the present disclosure relates to a natural gas hydrate tank container loading system which enables self-powered power generation and boil-off gas treatment, includes the refrigerator for inhibiting the generation of the boil-off gas (BOG), and the solar cell and the battery, and is configured to operate an electric generator by means of mixture gas made by mixing the boil-off gas (BOG) generated in the respective natural gas hydrate tank containers with fuel stored in a fuel tank, thereby supplementing the production of electric power by the solar cell, and thus ensuring a generation capacity sufficient to operate the refrigerator, and solving problems of fire, environmental pollution, or the like which occur when the boil-off gas (BOG) generated in the natural gas hydrate tank containers is discharged to the outside.

BACKGROUND ART

In general, hydrate is a solid substance in the form of ice including water molecules and gas molecules, and the hydrate is created as water and gas molecules come into contact with each other under predetermined pressure and a predetermined temperature. The hydrate is dissociated into water and gas molecules by changing pressure or a temperature, and the hydrate has high gas concentration because the hydrate has a crystal structure in which gas molecules are disposed in spaces made by water molecules, and as a result, the hydrate attracts attention as a new means for transporting and storing natural gas which is substituted for LNG.

That is, it has been known that because the natural gas hydrate has a phase equilibrium (self-preservation) effect under a predetermined temperature and pressure condition, the natural gas hydrate may accommodate methane gas as much as up to 170 times a volume of the natural gas hydrate, and the phase equilibrium may be maintained when the natural gas hydrate is stored and transported at a temperature of about −20° C.

Here, as examples in the related art for transporting the natural gas hydrate, for example, Korean Patent No. 10-0840059 discloses a natural gas transporting means configured such that hydrated natural gas is sealed and stored in container type storage containers, the container type storage containers are stacked on a transport ship in a container stack pattern, a hermetic protective cover is installed at an upper side of the transport ship so that the stacked containers are included, a portion between the protective cover and the container type storage container is filled with inert gas, and a constant temperature is maintained in the protective cover by an inert gas cooling unit installed to be connected to the protective cover. In addition, Korean Patent No. 10-1149498 discloses a natural gas hydrate container which includes a main body which has a natural gas hydrate storage space that is sealed by a door or opened, a cooling unit which is installed in a main body so as to cool the storage space, a discharge port which is provided in the main body so as to discharge natural gas from the storage space and controls a discharge of natural gas, and a drain port which is provided in the main body so as to discharge water from the storage space and controls a discharge of water.

Further, as another example in the related art for transporting the natural gas hydrate, for example, Korean Patent No. 10-1262647 discloses a natural gas hydrate loading apparatus capable of efficiently loading a large amount of NGH because the NGH is loaded directly into a cargo hold of an NGH transport ship by using a loading apparatus installed outside the NGH transport ship, such that it is not necessary to install additional equipment for loading the NGH to the NGH transport ship, and thus ship costs and maintenance costs for the NGH transport ship are reduced, and a shape of the cargo hold of the NGH transport ship is efficiently made. In addition, Korean Patent Application Laid-Open No. 10-2014-0065588 discloses an apparatus and a method for unloading gas hydrate which are capable of unloading marine-transported gas hydrate in a gasified state to the ground by using a floating cargo hold separable from the transport ship, and a dock that confines the cargo hold to the interior of the dock.

Various technologies for loading and transporting the natural gas hydrate have been presented in the related art as described above, but the natural gas hydrate transportation method in the related art has the following problems.

That is, because boil-off gas (BOG) is partially generated even in a case in which phase equilibrium of the natural gas hydrate is maintained, the boil-off gas causes an increase in pressure in a transport container such as a tank container, and the amount of generated boil-off gas may be rapidly increased in a case in which a predetermined temperature and pressure condition cannot be satisfied due to damage or a breakdown of the transport container such as the tank container.

Therefore, to minimize the amount of generated boil-off gas and maintain a phase equilibrium condition in the transport container such as the tank container, a refrigerator is installed and operated in the transport container such as the tank container in the related art.

However, in general, there is a practical limitation in connecting electric power lines individually to the transport container such as the tank container, which loads and transports the natural gas hydrate with several thousands of TEU, and operating the refrigerator, and as a result, there is a problem in that to transport a large number of transport containers such as the tank container to a long distance by using the existing ships such as a container ship, it is necessary to maintain an appropriate temperature and pressure condition for maintaining phase equilibrium and to manage boil-off gas (BOG) which is naturally generated.

In more detail, because the transport container such as the tank container is an adiabatic compression container, it is not greatly necessary to supply a heat quantity by the refrigerator in a case in which a transportation distance is short, but in a case in which a transportation distance becomes long, it is necessary to adjust a temperature condition for phase equilibrium by means of the refrigerator and the like because it may be difficult to maintain a temperature and pressure required for phase equilibrium of the adiabatic compression container over time.

In addition, it is necessary to improve a pressure resistance capacity of the transport container in order to prevent the occurrence of a risk that pressure in the transport container such as the tank container is excessively increased due to the boil-off gas (BOG) and the transport container is damaged, but the improvement of the pressure resistance capacity of the transport container causes a problem of a decrease in the amount of loaded natural gas hydrate caused by a limitation in weight for each unit tank container because of an increase in load of the transport container itself, and a problem of an increase in transport container manufacturing costs.

Further, in a case in which the boil-off gas is discharged to the outside of the transport container such as the tank container in order to prevent an increase in internal pressure, there is a problem of the occurrence of fire caused by lightning, friction, or spark, or a problem of environmental pollution.

Therefore, to solve the problems of the transportation method using the natural gas hydrate tank container in the related art, it is preferred to provide a natural gas hydrate tank container loading system which has a new configuration, enables self-powered power generation and boil-off gas treatment, may stack and transport a plurality of transport containers such as the tank container without excessively remodeling the existing ship such as a container ship or incurring costs, may stably supply electric power to the refrigerator for maintaining phase equilibrium of the respective transport containers during transportation with a simple configuration and low costs, and may effectively treat boil-off gas generated in the respective transport containers without discharging the boil-off gas to the outside, but an apparatus or a method, which meets all of the requirements, is not yet provided.

DOCUMENTS OF RELATED ART

1. Korean Patent No. 10-0840059 (Jun. 13, 2008)
2. Korean Patent No. 10-1149498 (May 17, 2012)
3. Korean Patent No. 10-1262647 (May 2, 2013)
4. Korean Patent Application Laid-Open No. 10-2014-0065588 (May 30, 2014)

DISCLOSURE

Technical Problem

The present disclosure has been made in an effort to solve the aforementioned problems in the related art, and an object of the present disclosure is to provide a natural gas hydrate tank container loading system which enables self-powered power generation and boil-off gas treatment, may operate a refrigerator so as to satisfy a temperature condition corresponding to a phase equilibrium condition of natural gas hydrate by charging a battery with electrical energy collected by installing a solar cell panel on an upper portion of tank containers stacked in a vertical direction, and thus may transport natural gas hydrate to a long distance with a simple configuration and low costs without excessively remodeling the existing ship or incurring a large amount of costs, in order to solve the problems of natural gas hydrate transportation methods in the related art in that there is a great limitation in connecting and operating an electric power line to a refrigerator for minimizing the amount of generated boil-off gas (BOG) and maintaining a phase equilibrium condition in the tank container in order to transport a large amount of natural gas hydrate to a long distance by using the ship.

In addition, another object of the present disclosure is to provide a natural gas hydrate tank container loading system which enables self-powered power generation and boil-off gas treatment, operates an electric generator by using the boil-off gas (BOG) generated in the transport container in addition to the operation of operating the refrigerator by charging the battery with electrical energy collected by the solar cell panel, operates a cooler by charging the battery with electric power generated by the electric generator, and thus may ensure electric power sufficient to operate the refrigerator, may always maintain the phase equilibrium of the natural gas hydrate even during long-distance transportation, and may solve a problem of fire or environmental pollution caused by a discharge of the boil-off gas, in order to solve the problems of natural gas hydrate transportation methods in the related art in that during transportation of the natural gas hydrate, it is necessary to improve a pressure resistance capacity of the transport container in order to prevent the occurrence of a risk that pressure in the transport container such as the tank container is excessively increased due to the boil-off gas (BOG) and the transport container is damaged, but the improvement of the pressure resistance capacity of the transport container causes a problem of a decrease in the amount of loaded natural gas hydrate caused by a limitation in weight for each unit tank container because of an increase in load of the transport container itself, and a problem of an increase in transport container manufacturing costs, and in a case in which the boil-off gas is discharged to the outside of the transport container such as the tank container in order to prevent an increase in internal pressure, there is a problem of the occurrence of fire caused by lightning, friction, or spark, or a problem of environmental pollution.

Technical Solution

To achieve the aforementioned objects, the present disclosure provides a natural gas hydrate tank container loading system enabling self-powered power generation and boil-off gas treatment, which solves problems of natural gas hydrate transportation methods in the related art in that there is a limitation in connecting and operating an electric power line to a refrigerator for maintaining a phase equilibrium condition in natural gas hydrate tank containers during long-distance transportation of natural gas hydrate, the natural gas hydrate tank container loading system including: a plurality of natural gas hydrate tank containers which is stacked to be stacked in a vertical direction; a refrigerator which is installed at one side of each of the natural gas hydrate tank containers in order to maintain phase equilibrium of the natural gas hydrate stored in each of the natural gas hydrate tank containers; an electric power supply unit which is installed at an upper portion of an uppermost container, among the plurality of gas hydrate tank containers vertically stacked, in order to supply electric power for operating the respective refrigerators by generating electric power by using sunlight and boil-off gas (BOG) generated from the natural gas hydrate tank containers; a sensor unit which includes a plurality of sensors including temperature and pressure sensors for detecting a current state including an internal temperature or pressure in the respective natural gas hydrate tank containers, and a control unit which controls operations of the refrigerator and the electric power supply unit and an overall operation of the loading system based on the state detected by the respective sensors of the sensor unit.

Here, the loading system may further include an electric power line for supplying electric power generated by the electric power supply unit to the respective refrigerators, and a boil-off gas pipe for supplying boil-off gas (BOG) generated from the respective natural gas hydrate tank containers to the electric power supply unit.

In addition, the electric power supply unit may include a photovoltaic array which generates electric power by using sunlight, an electric generator which is operated by boil-off gas generated from the respective natural gas hydrate tank containers, a fuel tank which stores fuel to be supplied to the electric generator, a compressor which mixes fuel supplied from the fuel tank with boil-off gas generated from the natural gas hydrate tank container and supplies the mixed fuel and boil-off gas to the electric generator, a battery (rechargeable battery cells) which stores electrical energy generated by the photovoltaic array and the electric generator, a fuel safety device which prevents fire and explosion caused by a reverse flow during combustion of the boil-off gas, and a housing which accommodates the electric generator, the fuel tank, the compressor, the battery, and the fuel safety device, and the electric power supply unit may charge the battery by the electric generator operated by using the photovoltaic array and the boil-off gas (BOG), and may operate the refrigerator and the compressor by using electrical energy with which the battery is charged, such that phase equilibrium in the respective natural gas hydrate tank container is always maintained without being supplied with separate electric power.

Further, the loading system may be configured such that in addition to the operation of generating electric power by using the photovoltaic array, mixture gas is produced by mixing the boil-off gas (BOG) generated from the respective natural gas hydrate tank containers with fuel stored in the fuel tank through the boil-off gas pipe, and the electric generator is operated by supplying the produced mixture gas to the electric generator through the compressor, such that electric power sufficient to operate the respective refrigerator is always ensured regardless of external factors including a weather condition, the natural gas hydrate is transported to a long distance without having a separate electric power supply device, the boil-off gas (BOG) generated from the respective natural gas hydrate tank containers is treated without being discharged to the outside, and a problem of environmental pollution or fire caused by a discharge of the boil-off gas BOG is solved.

Further, the loading system may further include a display unit which displays the current state including an internal temperature and pressure in the respective natural gas hydrate tank containers which is detected by the sensor unit so that the current state is monitored from the outside, a communication unit which transmits the current state of the loading system to the outside, and a fire extinguisher which copes with fire.

In addition, the present disclosure provides a natural gas hydrate transportation ship comprising the natural gas hydrate tank container loading system enabling self-powered power generation and boil-off gas treatment.

Further, the present disclosure provides a natural gas hydrate transportation method configured to transport natural gas hydrate by using the natural gas hydrate tank container loading system enabling self-powered power generation and boil-off gas treatment.

Effect

According to the present disclosure as described above, there is provided the natural gas hydrate tank container loading system which enables self-powered power generation and boil-off gas treatment, may operate the refrigerator so as to satisfy a temperature condition corresponding to a phase equilibrium condition of natural gas hydrate by charging the battery with electrical energy collected by installing the solar cell panel on the upper portion of the tank containers stacked in the vertical direction, and thus may transport natural gas hydrate to a long distance with a simple configuration and low costs without excessively remodeling the existing ship or incurring a large amount of costs, thereby solving problems of the natural gas hydrate transportation methods in the related art in that there is a great limitation in connecting and operating the electric power line to the refrigerator for minimizing the amount of generated boil-off gas (BOG) and maintaining a phase equilibrium condition in the tank container in order to transport a large amount of natural gas hydrate to a long distance by using the ship.

In addition, according to the present disclosure, there is provided the natural gas hydrate tank container loading system which enables self-powered power generation and boil-off gas treatment, operates an electric generator by using the boil-off gas (BOG) generated in the transport container in addition to the operation of operating the refrigerator by charging the battery with electrical energy collected by the solar cell panel, operates the cooler by charging the battery with electric power generated by the electric generator, and thus may ensure electric power sufficient to operate the refrigerator, may always maintain the phase equilibrium of the natural gas hydrate even during long-distance transportation, and may solve a problem of fire or environmental pollution caused by the discharged boil-off gas, thereby solving the problems of natural gas hydrate transportation methods in the related art in that during transportation of the natural gas hydrate, it is necessary to improve a pressure resistance capacity of the transport container in order to prevent the occurrence of a risk that pressure in the transport container such as the tank container is excessively increased due to the boil-off gas (BOG) and the transport container is damaged, but the improvement of the pressure resistance capacity of the transport container causes a problem of a decrease in the amount of loaded natural gas hydrate caused by a limitation in weight for each unit tank container because of an increase in load of the transport container itself, and a problem of an increase in transport container manufacturing costs, and in a case in which the boil-off gas is discharged to the outside of the transport container such as the tank container in order to prevent an increase in internal pressure, there is a problem of the occurrence of fire caused by lightning, friction, or spark, or a problem of environmental pollution.

DESCRIPTION OF DRAWINGS

FIG. 1 is a view schematically illustrating an entire configuration of a natural gas hydrate tank container loading system enabling self-powered power generation and boil-off gas treatment according to an exemplary embodiment of the present disclosure.

FIG. 2 is a view schematically illustrating a specific configuration of an electric power supply unit of the natural gas hydrate tank container loading system enabling self-powered power generation and boil-off gas treatment according to the exemplary embodiment of the present disclosure which is illustrated in FIG. 1.

FIG. 3 is a view illustrating an entire configuration of the natural gas hydrate tank container loading system enabling self-powered power generation and boil-off gas treatment according to the exemplary embodiment of the present disclosure.

FIG. 4 is a view schematically illustrating an electric power line connecting structure of the natural gas hydrate tank container loading system enabling self-powered power generation and boil-off gas treatment according to the present disclosure.

FIG. 5 is a view schematically illustrating a specific configuration of the electric power line connecting structure of the natural gas hydrate tank container loading system enabling self-powered power generation and boil-off gas treatment according to the present disclosure which is illustrated in FIG. 4.

FIG. 6 is a view schematically illustrating a boil-off gas pipe connecting structure of the natural gas hydrate tank container loading system enabling self-powered power generation and boil-off gas treatment according to the present disclosure.

BEST MODE

Hereinafter, a specific exemplary embodiment of a natural gas hydrate tank container loading system enabling self-powered power generation and boil-off gas treatment according to the present disclosure will be described with reference to the accompanying drawings.

Here, it is noted that the following description is just one exemplary embodiment for implementing the present disclosure, and the present disclosure is not limited only to the contents of the exemplary embodiment to be described below.

In addition, it is noted that in the description of the exemplary embodiment of the present disclosure, descriptions of parts, which are determined as being identical or similar to parts in the related art or being easily understood and implemented by those skill in the art, will be omitted for briefly describing the present disclosure.

That is, as described below, the present disclosure relates to a natural gas hydrate tank container loading system which enables self-powered power generation and boil-off gas treatment, may operate a refrigerator so as to satisfy a temperature condition corresponding to a phase equilibrium condition of natural gas hydrate by charging a battery with electrical energy collected by installing a solar cell panel on an upper portion of tank containers stacked in a vertical direction, and thus may transport natural gas hydrate to a long distance with a simple configuration and low costs without excessively remodeling the existing ship or incurring a large amount of costs, in order to solve problems of natural gas hydrate transportation methods in the related art in that there is a great limitation in connecting and operating an electric power line to a refrigerator for minimizing the amount of generated boil-off gas (BOG) and maintaining a phase equilibrium condition in the tank container in order to transport a large amount of natural gas hydrate to a long distance by using the ship.

In addition, as described below, the present disclosure relates to a natural gas hydrate tank container loading system which enables self-powered power generation and boil-off gas treatment, operates an electric generator by using the boil-off gas (BOG) generated in the transport container in addition to the operation of operating the refrigerator by charging the battery with electrical energy collected by the solar cell panel, operates a cooler by charging the battery with electric power generated by the electric generator, and thus may ensure electric power sufficient to operate the refrigerator, may always maintain the phase equilibrium of the natural gas hydrate even during long-distance transportation, and may solve a problem of fire or environmental pollution caused by a discharge of the boil-off gas, in order to solve the problems of natural gas hydrate transportation methods in the related art in that during transportation of the natural gas hydrate, it is necessary to improve a pressure resistance capacity of the transport container in order to prevent the occurrence of a risk that pressure in the transport container such as the tank container is excessively increased due to the boil-off gas (BOG) and the transport container is damaged, but the improvement of the pressure resistance capacity of the transport container causes a problem of a decrease in the amount of loaded natural gas hydrate caused by a limitation in weight for each unit tank container because of an increase in load of the transport container itself, and a problem of an increase in transport container manufacturing costs, and in a case in which the boil-off gas is discharged to the outside of the transport container such as the tank container in order to prevent an increase in internal pressure, there is a problem of the occurrence of fire caused by lightning, friction, or spark, or a problem of environmental pollution.

Next, a specific exemplary embodiment of the natural gas hydrate tank container loading system enabling self-powered power generation and boil-off gas treatment according to the present disclosure, which is configured as described above, will be described with reference to the drawings.

First, referring to FIG. 1, FIG. 1 is a view schematically illustrating an entire configuration of the natural gas hydrate tank container loading system enabling self-powered power generation and boil-off gas treatment according to the exemplary embodiment of the present disclosure.

As illustrated in FIG. 1, a natural gas hydrate tank container loading system 10 enabling self-powered power generation and boil-off gas treatment according to the exemplary embodiment of the present disclosure roughly includes a plurality of natural gas hydrate tank containers 11 which is stacked to be stacked in a vertical direction, a refrigerator 12 which is installed at one side of each of the natural gas hydrate tank containers in order to maintain phase equilibrium of natural gas hydrate stored in each of the stacked natural gas hydrate tank containers, an electric power supply unit 13 which includes an electric generator and a battery operated by using a photovoltaic array installed at an upper end of the natural gas hydrate tank container 11 and by using boil-off gas (BOG) for supplying electric power for operating the respective refrigerators 12, a sensor unit 14 which includes various types of sensors such as temperature and pressure sensors for detecting a state such as an internal temperature or pressure in the respective natural gas hydrate tank containers, and a control unit (not illustrated) which controls operations of the refrigerator and the electric power supply unit 13 and an overall operation of the loading system 10 based on the state detected by the respective sensors of the sensor unit 14.

In addition, the loading system 10 further includes an electric power line 15 for supplying electric power produced by the electric power supply unit 13 to the refrigerator 12 of each of the natural gas hydrate tank containers, and a boil-off gas pipe 16 for supplying boil-off gas generated from the respective natural gas hydrate tank containers, together with fuel, to an electric generator installed to the electric power supply unit 13.

Further, although not illustrated, the loading system 10 may further include a display unit which displays the current state such as an internal temperature, pressure, and the like in the respective natural gas hydrate tank containers which is detected by the sensor unit 14 so that the current state may be monitored from the outside, a communication unit which transmits the state of the loading system 10 to the outside, and a fire extinguisher which copes with fire that may occur at the electric generator operated by using the boil-off gas, or the refrigerator for maintaining the phase equilibrium in the natural gas hydrate tank container.

That is, as illustrated in FIG. 1, the natural gas hydrate tank container loading system 10 enabling self-powered power generation and boil-off gas treatment according to the exemplary embodiment of the present disclosure is characterized by charging the battery by collecting electric power from the electric generator operated by using the boil-off gas (BOG) and the photovoltaic array installed to an uppermost container among the gas hydrate transport containers such as tank containers stacked in the vertical direction, and operating the refrigerator and a compressor for maintaining a phase equilibrium condition of the natural gas hydrate by using the electrical energy with which the battery is charged.

In more detail, referring to FIG. 2, FIG. 2 is a view schematically illustrating a specific configuration of the electric power supply unit 13 of the natural gas hydrate tank container loading system 10 enabling self-powered power generation and boil-off gas treatment according to the exemplary embodiment of the present disclosure which is illustrated in FIG. 1.

As illustrated in FIG. 2, the electric power supply unit 13 includes a photovoltaic array 21 which generates electric power by using sunlight, and a battery (rechargeable battery cells) 22 which stores the electrical energy generated by the photovoltaic array 21, such that the electric power supply unit 13 is configured to operate the refrigerators 12 for maintaining phase equilibrium in the respective natural gas hydrate tank containers without being supplied with separate electric power.

Here, for example, the electric power supply unit 13 has a separate electric generator 23, a compressor 24, and a fuel tank 25 which are provided in a housing 26, as illustrated in FIG. 2, so as to charge the embedded battery 22 in order to prepare for a situation in which an insufficient amount of electric power is generated by the photovoltaic array 21 due to a weather condition or the like.

In more detail, in addition to the operation of generating electric power by using the photovoltaic array 21, the electric power supply unit 13 is configured such that valves for discharging the boil-off gas (BOG) are installed to the natural gas hydrate tank containers, respectively, mixture gas is produced by mixing the boil-off gas (BOG) generated from the respective natural gas hydrate tank containers with fuel stored in the fuel tank 25 through the boil-off gas pipe 16, and the electric generator 23 is operated by supplying the mixture gas produced as described above to the electric generator 23 through the compressor 23, and as a result, it is possible to always ensure electric power sufficient to operate the respective refrigerators regardless of external factors such as a weather condition, and it is possible to treat the boil-off gas (BOG) generated from the respective natural gas hydrate tank containers without discharging the boil-off gas to the outside, thereby eliminating a problem of environmental pollution or fire caused by a discharge of the boil-off gas (BOG) unlike the related art.

That is, referring to FIG. 3, FIG. 3 is a view illustrating a concept of an entire configuration of the natural gas hydrate tank container loading system 10 enabling self-powered power generation and boil-off gas treatment according to the exemplary embodiment of the present disclosure which is configured as described above.

Here, as illustrated in FIGS. 2 and 3, the electric power supply unit 13 includes a temperature sensor, a detonation arrester, a quick closing valve, and a flashback pressure valve, and may further include a fuel safety device 27 which is included in the housing 26 and configured to prevent fire and explosion caused by a reverse flow during combustion of the boil-off gas (BOG).

Therefore, the natural gas hydrate tank container loading system 10 enabling self-powered power generation and boil-off gas treatment according to the present disclosure may be implemented as illustrated in FIGS. 1 to 3, and as a result, it is possible to operate the refrigerator by charging the battery with electrical energy collected by the photovoltaic array 21, and thus to operate the refrigerator for maintaining phase equilibrium of the natural gas hydrate without being supplied with separate electric power, and in addition, the battery is also charged with electric power generated by operating the electric generator by using the boil-off gas BOG, and as a result, it is possible to ensure electric power sufficient to operate the refrigerator even in a case in which a weather condition is worsen which is a drawback in photovoltaic generation, such that it is possible to transport the natural gas hydrate to a long distance without having a separate electric power supply device, and thus to solve a problem of fire or environmental pollution caused by a discharge of the boil-off gas.

In addition, the natural gas hydrate tank container loading system 10 enabling self-powered power generation and boil-off gas treatment according to the exemplary embodiment of the present disclosure, which is configured as described above, may include an electric power line connecting structure which automatically connects the electric power line which is connected manually in the related art, for operating the refrigerator and a boil-off gas pipe connecting structure which automatically connects a boil-off gas capturing pipe which is connected manually in the related art, as described below.

Next, specific configurations of the electric power line connecting structure and the boil-off gas pipe connecting structure, which are configured to automatically perform the connection operations, which are performed manually in the related art, will be described with reference to FIGS. 4 to 6.

First, referring to FIG. 4, FIG. 4 is a view schematically illustrating the electric power line connecting structure of the natural gas hydrate tank container loading system 10 enabling self-powered power generation and boil-off gas treatment according to the present disclosure, that is, FIG. 4 illustrates a specific configuration of part A indicated by a dotted line in FIG. 2.

In addition, referring to FIG. 5, FIG. 5 is a view schematically illustrating a specific configuration of the electric power line connecting structure of the natural gas hydrate tank container loading system 10 enabling self-powered power generation and boil-off gas treatment according to the present disclosure which is illustrated in FIG. 4.

In more detail, as illustrated in FIGS. 4 and 5, in the electric power line connecting structure of the natural gas hydrate tank container loading system enabling self-powered power generation and boil-off gas treatment according to the exemplary embodiment of the present disclosure, one end side of the electric power line is configured to protect an electrode in a plug by a sloped water proof hinge type plug 41, which is hingedly connected in a state of being inclined to prevent an electric leakage caused by an inflow of rainwater or the like at normal times, and a compressive spring 42 installed below the sloped waterproof hinge type plug 41, and the other end side of the electric power line is configured to have a socket 43 coupled to the electrode of the sloped waterproof hinge type plug 41 and a pressor foot 44 for pressing the sloped waterproof hinge type plug 41 and to be fixed in the vicinity of upper and lower ends of the containers.

As described above, connecting structures are configured at both end sides of the electric power line 15, and as a result, as illustrated in FIGS. 4 and 5, when the upper gas hydrate tank container is stacked in the vertical direction, the electrode is exposed as the pressor foot 44 presses the sloped waterproof hinge type plug 41 and the sloped waterproof hinge type plug 41 is inserted into the socket 43 of the upper electric power line, such that the sloped waterproof hinge type plug 41 and the socket 43 are automatically coupled to each other, and when the sloped waterproof hinge type plug 41 and the socket 43 are separated from each other when removing the upper container, the sloped waterproof hinge type plug 41 automatically returns back to the original state by the compressive spring 42.

Therefore, an operation of connecting the electric power line for operating the refrigerator is manually and individually performed in the related art, but according to the electric power line connecting structure of the natural gas hydrate tank container loading system enabling self-powered power generation and boil-off gas treatment according to the exemplary embodiment of the present disclosure, the connecting structures are formed at both end sides of the electric power line as illustrated in FIGS. 4 and 5, and as a result, it is possible to automatically perform operations of connecting and disconnecting the electric power line just by loading and unloading the containers.

Next, referring to FIG. 6, FIG. 6 is a view schematically illustrating the boil-off gas pipe connecting structure of the natural gas hydrate tank container loading system 10 enabling self-powered power generation and boil-off gas treatment according to the present disclosure, that is, FIG. 6 illustrates a specific configuration of part B indicated by a dotted line in FIG. 2.

In more detail, as illustrated in FIG. 6, the boil-off gas pipe connecting structure of the natural gas hydrate tank container loading system enabling self-powered power generation and boil-off gas treatment according to the exemplary embodiment of the present disclosure is configured such that a conical valve opening and closing protrusion 61 is formed at one end side of the boil-off gas pipe, and a compressive spring 62 is installed at a lower side of the valve opening and closing protrusion 61, and as a result, the valve opening and closing protrusion 61 is opened by being pressed downward, and the valve opening and closing protrusion 61 is closed when pressure is eliminated, and the boil-off gas pipe connecting structure is configured such that a connector 63, which is coupled to the valve opening and closing protrusion 61, is installed at the other end side of the boil-off gas pipe, and separate fixing means 64 are fixed to upper and lower end portions of the containers, respectively, thereby forming a connection valve which is automatically opened as the valve opening and closing protrusion 61 and the connector 63 come into contact with each other when stacking the containers.

With the aforementioned configuration, as illustrated in FIG. 6, when the upper gas hydrate tank container is stacked in the vertical direction, the valve opening and closing protrusion 61 of the lower container is automatically coupled to the connector 63 of the upper container as the valve opening and closing protrusion 61 of the lower container is inserted into the connector 63 of the upper container, and the valve opening and closing protrusion 61 is automatically opened as the compressive spring 62 is pressed by a load of the container, and when the upper container is removed, the valve opening and closing protrusion 61 is closed as the valve opening and closing protrusion 61 automatically returns back to the original state by the compressive spring 62.

That is, an operation of connecting the pipe for discharging boil-off gas is manually and individually performed in the related art, but according to the boil-off gas pipe connecting structure of the natural gas hydrate tank container loading system enabling self-powered power generation and boil-off gas treatment according to the exemplary embodiment of the present disclosure, the connecting structures are configured at both end sides of the boil-off gas pipe as illustrated in FIG. 6, and as a result, it is possible to automatically perform operations of connecting and disconnecting the boil-off gas pipe just by loading and unloading the containers.

According to the configuration of the natural gas hydrate tank container loading system 10 enabling self-powered power generation and boil-off gas treatment according to the exemplary embodiment of the present disclosure, the refrigerator is operated by charging the battery with electric power generated by operating the electric generator by using boil-off gas (BOG) and electrical energy collected by the photovoltaic array 21, such that it is possible to ensure electric power sufficient to operate the refrigerator for maintaining phase equilibrium of the natural gas hydrate without being supplied with separate electric power, transport the natural gas hydrate to a long distance, solve problems of fire or environmental pollution caused by a discharge of boil-off gas, and more quickly and easily perform the operations of loading and unloading the natural gas hydrate tank containers by automatically performing the operation of connecting the electric power line and the pipe which is performed manually in the related art.

Therefore, as described above, the natural gas hydrate tank container loading system enabling self-powered power generation and boil-off gas treatment according to the present disclosure may be implemented.

In addition, according to the present disclosure which implements the natural gas hydrate tank container loading system enabling self-powered power generation and boil-off gas treatment according to the present disclosure as described above, there is provided the natural gas hydrate tank container loading system which enables self-powered power generation and boil-off gas treatment, may operate the refrigerator so as to satisfy a temperature condition corresponding to a phase equilibrium condition of natural gas hydrate by charging the battery with electrical energy collected by installing the solar cell panel on the upper portion of the tank containers stacked in the vertical direction, and thus may transport natural gas hydrate to a long distance with a simple configuration and low costs without excessively remodeling the existing ship or incurring a large amount of costs, thereby solving problems of the natural gas hydrate transportation methods in the related art in that there is a great limitation in connecting and operating the electric power line to the refrigerator for minimizing the amount of generated boil-off gas (BOG) and maintaining a phase equilibrium condition in the tank container in order to transport a large amount of natural gas hydrate to a long distance by using the ship.

In addition, according to the present disclosure, there is provided the natural gas hydrate tank container loading system which enables self-powered power generation and boil-off gas treatment, operates an electric generator by using the boil-off gas (BOG) generated in the transport container in addition to the operation of operating the refrigerator by charging the battery with electrical energy collected by the solar cell panel, operates the cooler by charging the battery with electric power generated by the electric generator, and thus may ensure electric power sufficient to operate the refrigerator, may always maintain the phase equilibrium of the natural gas hydrate even during long-distance transportation, and may solve a problem of fire or environmental pollution caused by the discharged boil-off gas, thereby solving the problems of natural gas hydrate transportation methods in the related art in that during transportation of the natural gas hydrate, it is necessary to improve a pressure resistance capacity of the transport container in order to prevent the occurrence of a risk that pressure in the transport container such as the tank container is excessively increased due to the boil-off gas (BOG) and the transport container is damaged, but the improvement of the pressure resistance capacity of the transport container causes a problem of a decrease in the amount of loaded natural gas hydrate caused by a limitation in weight for each unit tank container because of an increase in load of the transport container itself, and a problem of an increase in transport container manufacturing costs, and in a case in which the boil-off gas is discharged to the outside of the transport container such as the tank container in order to prevent an increase in internal pressure, there is a problem of the occurrence of fire caused by lightning, friction, or spark, or a problem of environmental pollution.

While the detailed description of the natural gas hydrate tank container loading system enabling self-powered power generation and boil-off gas treatment according to the present disclosure has been described above through the exemplary embodiments of the present disclosure, the present disclosure is not limited only to the contents of the exemplary embodiment, and thus the present disclosure may of course be variously modified, changed, combined, and substituted in accordance with design necessity and other various factors by those skilled in the art to which the present disclosure pertains.

DESCRIPTION OF REFERENCE NUMERALS

10: natural gas hydrate tank container loading system
11: natural gas hydrate tank container
12: refrigerator
13: electric power supply unit
14: sensor unit
15: electric power line
16: boil-off gas pipe
21: photovoltaic array
22: battery
23: electric generator
24: compressor
25: fuel tank
26: housing
27: fuel safety device
41: sloped waterproof hinge type plug
42: compressive spring
43: socket
44: pressor foot
61: valve opening and closing protrusion
62: compressive spring
63: connector
64: fixing means

The invention claimed is:

1. A natural gas hydrate tank container loading system enabling self-powered power generation and boil-off gas treatment, which solves problems of natural gas hydrate transportation methods in the related art in that there is a limitation in connecting and operating an electric power line to a refrigerator for maintaining a phase equilibrium condition in natural gas hydrate tank containers during long-distance transportation of natural gas hydrate, the natural gas hydrate tank container loading system comprising:

a plurality of natural gas hydrate tank containers which is stacked to be stacked in a vertical direction;

a refrigerator which is installed at one side of each of the natural gas hydrate tank containers in order to maintain phase equilibrium of the natural gas hydrate stored in each of the natural gas hydrate tank containers;

an electric power supply unit which is installed at an upper portion of an uppermost container, among the plurality of the gas hydrate tank containers vertically stacked, in order to supply electric power for operating the respective refrigerators by generating electric power by using sunlight and boil-off gas (BOG) generated from the natural gas hydrate tank containers;

a sensor unit which includes a plurality of sensors including temperature and pressure sensors for detecting a current state including an internal temperature or pressure in the respective natural gas hydrate tank containers, and a control unit which controls operations of the refrigerator and the electric power supply unit and an overall operation of the loading system based on the state detected by the respective sensors of the sensor unit, wherein the electric power supply unit includes a photovoltaic array which generates electric power by using sunlight, an electric generator which is operated by boil-off gas generated from the respective natural gas hydrate tank containers, a fuel tank which stores fuel to be supplied to the electric generator, a compressor which mixes fuel supplied from the fuel tank with boil-off gas generated from the natural gas hydrate tank container and supplies the mixed fuel and boil-off gas to the electric generator, a battery (rechargeable battery cells) which stores electrical energy generated by the photovoltaic array and the electric generator, a fuel safety device which prevents fire and explosion caused by a reverse flow during combustion of the boil-off gas, and a housing which accommodates the electric generator, the fuel tank, the compressor, the battery, and the fuel safety device, and the electric power supply unit charges the battery by the electric generator operated by using the photovoltaic array and the boil-off gas (BOG), and operates the refrigerator and the compressor by using electrical energy with which the battery is charged, such that phase equilibrium in the respective natural gas hydrate tank container is always maintained without being supplied with separate electric power.

2. The natural gas hydrate tank container loading system of claim 1, wherein the loading system further includes an electric power line for supplying electric power produced by the electric power supply unit to the respective refrigerators, and a boil-off gas pipe for supplying boil-off gas (BOG) generated from the respective natural gas hydrate tank containers to the electric power supply unit.

3. The natural gas hydrate tank container loading system of claim 1, wherein the loading system is configured such that in addition to the operation of generating electric power by using the photovoltaic array, mixture gas is produced by mixing the boil-off gas (BOG) generated from the respective natural gas hydrate tank containers with fuel stored in the fuel tank through the boil-off gas pipe, and the electric generator is operated by supplying the produced mixture gas to the electric generator through the compressor, such that electric power sufficient to operate the respective refrigerator is always ensured regardless of external factors including a weather condition, the natural gas hydrate is transported to a long distance without having a separate electric power supply device, the boil-off gas (BOG) generated from the respective natural gas hydrate tank containers is treated without being discharged to the outside, and a problem of environmental pollution or fire caused by a discharge of the boil-off gas BOG is solved.

4. The natural gas hydrate tank container loading system of claim 1, wherein the loading system further includes a display unit which displays the current state including an internal temperature and pressure in the respective natural gas hydrate tank containers which is detected by the sensor unit so that the current state is monitored from the outside, a communication unit which transmits the current state of the loading system to the outside, and a fire extinguisher which copes with fire.

* * * * *